(12) United States Patent
Reddy et al.

(10) Patent No.: US 10,337,311 B2
(45) Date of Patent: Jul. 2, 2019

(54) METHODS OF FORMING VARIABLE STRENGTH PROPPANT PACKS

(71) Applicant: Halliburton Energy Services, Inc., Houston, TX (US)

(72) Inventors: B. Raghava Reddy, The Woodlands, TX (US); Ubong Inyang, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 23 days.

(21) Appl. No.: 15/314,781

(22) PCT Filed: Sep. 3, 2014

(86) PCT No.: PCT/US2014/053901
§ 371 (c)(1),
(2) Date: Nov. 29, 2016

(87) PCT Pub. No.: WO2016/036363
PCT Pub. Date: Mar. 10, 2016

(65) Prior Publication Data
US 2017/0190959 A1      Jul. 6, 2017

(51) Int. Cl.
*E21B 43/267* (2006.01)
*C09K 8/80* (2006.01)
*C09K 8/62* (2006.01)

(52) U.S. Cl.
CPC .............. *E21B 43/267* (2013.01); *C09K 8/62* (2013.01); *C09K 8/80* (2013.01); *C09K 8/805* (2013.01)

(58) Field of Classification Search
None
See application file for complete search history.

(56) References Cited

U.S. PATENT DOCUMENTS

| 4,078,609 A | 3/1978 | Pavlich |
| 6,776,235 B1 * | 8/2004 | England ............... E21B 43/267 166/271 |

(Continued)

FOREIGN PATENT DOCUMENTS

| WO | 2013055851 A2 | 4/2013 |
| WO | 2016036363 A1 | 3/2016 |

OTHER PUBLICATIONS

International Search Report and Written Opinion for PCT/US2014/053901 dated Apr. 30, 2015.

*Primary Examiner* — Anuradha Ahuja
(74) *Attorney, Agent, or Firm* — McGuireWoods LLP

(57) ABSTRACT

A variable strength proppant pack may be useful in maintaining a higher porosity and conductivity of the proppant pack over time. Forming a variable strength proppant pack may involve introducing a fluid having a composition into a subterranean formation having a fracture network therein, wherein the fluid composition changes between a plurality of compositions that comprise: a first proppant-laden fluid comprising first proppant particles, and a second proppant-laden fluid comprising second proppant particles having a crush strength greater than a crush strength of the first proppant particles; and forming a proppant pack in at least a portion of the fracture network, the proppant pack having first proppant portions comprising the first proppant particles and second proppant portions comprising the second proppant particles.

22 Claims, 4 Drawing Sheets

(56) References Cited

U.S. PATENT DOCUMENTS

| | | | |
|---|---|---|---|
| 7,210,528 B1 | 5/2007 | Brannon et al. | |
| 7,472,751 B2 | 1/2009 | Brannon et al. | |
| 7,918,277 B2 | 4/2011 | Brannon et al. | |
| 8,061,424 B2 | 11/2011 | Willberg et al. | |
| 8,490,700 B2 | 7/2013 | Lesko et al. | |
| 2006/0157243 A1* | 7/2006 | Nguyen | C09K 8/805 |
| | | | 166/280.2 |
| 2012/0305247 A1 | 12/2012 | Chen et al. | |
| 2012/0325472 A1 | 12/2012 | Litvinets et al. | |
| 2013/0146292 A1 | 6/2013 | Litvinets et al. | |
| 2014/0060826 A1* | 3/2014 | Nguyen | E21B 43/267 |
| | | | 166/280.1 |
| 2014/0224493 A1 | 8/2014 | Soliman et al. | |
| 2014/0374093 A1* | 12/2014 | Nguyen | E21B 43/267 |
| | | | 166/280.1 |
| 2015/0083420 A1* | 3/2015 | Gupta | E21B 43/267 |
| | | | 166/280.2 |
| 2015/0315892 A1* | 11/2015 | McDaniel | C09K 8/80 |
| | | | 166/280.2 |

\* cited by examiner

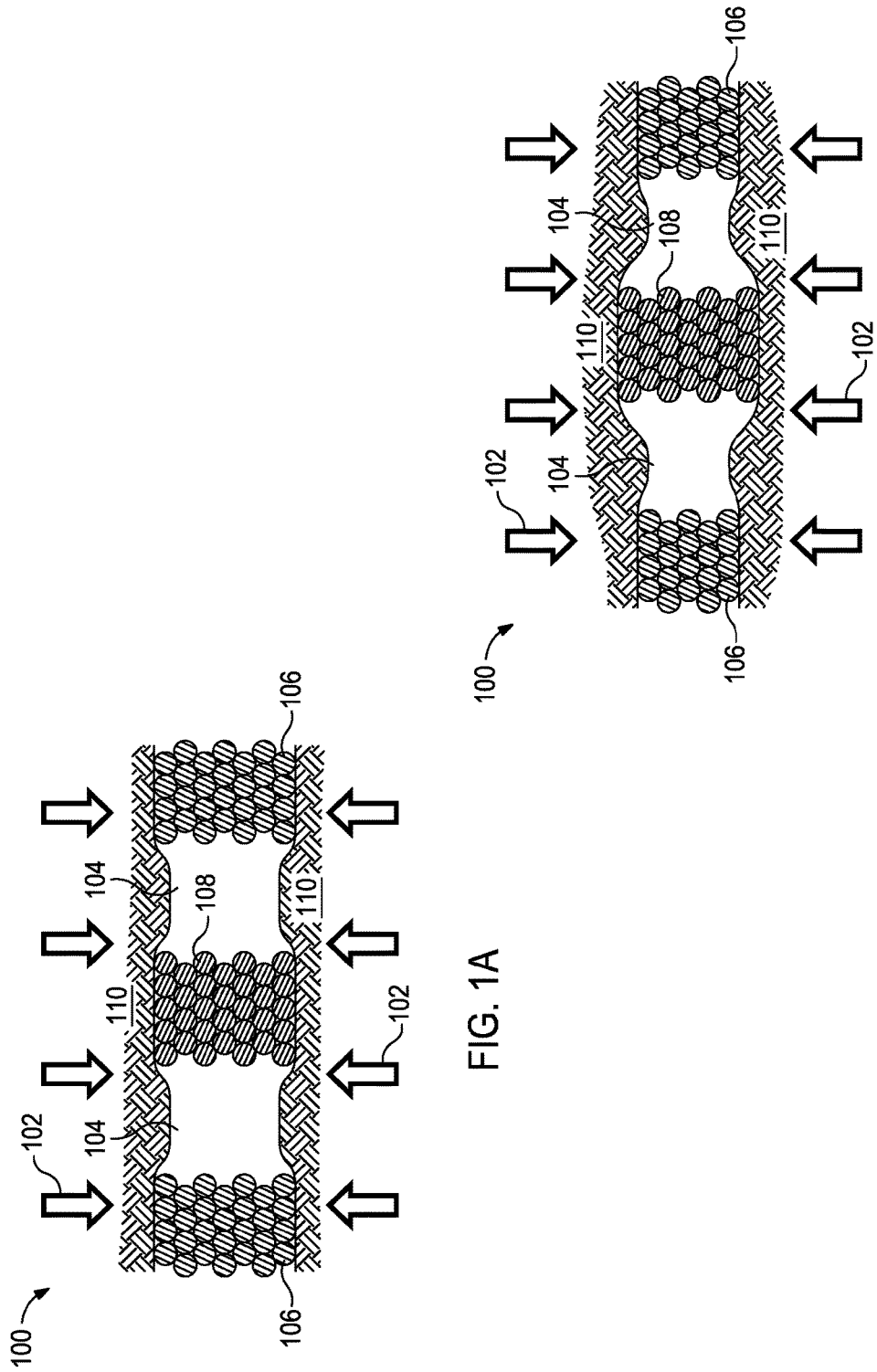

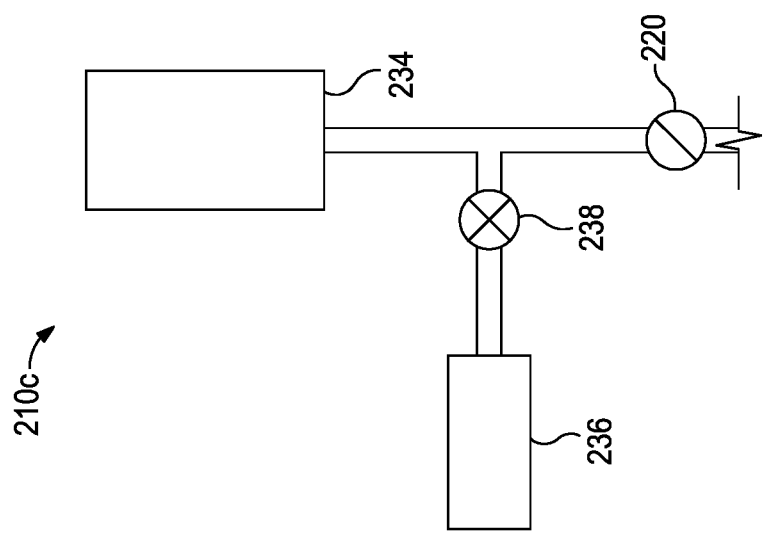

METHODS OF FORMING VARIABLE STRENGTH PROPPANT PACKS

BACKGROUND

The exemplary embodiments described herein relate to methods of forming proppant packs in subterranean formations.

Subterranean formations are often stimulated by hydraulic fracturing operations to enhance the volume of fluid produced from the formation in later production operations. In traditional hydraulic fracturing operations, a fracturing fluid, which may also function simultaneously or subsequently as a carrier fluid, is pumped into a portion of a subterranean formation at a rate and pressure sufficient to create or extend at least one fracture therein. Typically, particulate solids, often referred to as "proppant particles," are suspended in a portion of the fracturing fluid or a subsequently introduced proppant slurry. The proppant particles fill at least a portion of the fractures to form a "proppant pack" and serve to prevent the fractures from fully closing once the hydraulic pressure is removed. By keeping the fractures from fully closing, conductive paths are formed through which fluids produced from the formation may flow.

The degree of success of a subsequent production operation depends, at least in part, upon the porosity and conductivity of the proppant pack. The porosity and conductivity of the proppant pack may reduce over time as some of the proppant particles eventually crush under the continuous closure pressure applied by the formation. Additionally, in proppant-free volumes of the proppant pack, the formation closure pressure (without resistance from proppant particles) may deform over time causing the cross-section of the fracture at the proppant-free volume to reduce and potentially close, sometimes referred to as "pinching off." In some instances, the pinching off at proppant-free volumes of a fracture may be exacerbated by the foregoing loss of proppant particles in adjacent areas.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1A provides an illustrative representation of a fracture under formation pressure after the hydraulic pressure has been removed.

FIG. 1B provides an illustrative representation of the fracture of FIG. 1A under formation pressure after a period of time has elapsed.

FIG. 2D provides an illustration of a mixing system suitable for continuously flowing a first proppant-laden fluid and adding second proppant particles thereto to produce the second proppant-laden fluid.

DETAILED DESCRIPTION

Figure 2A:
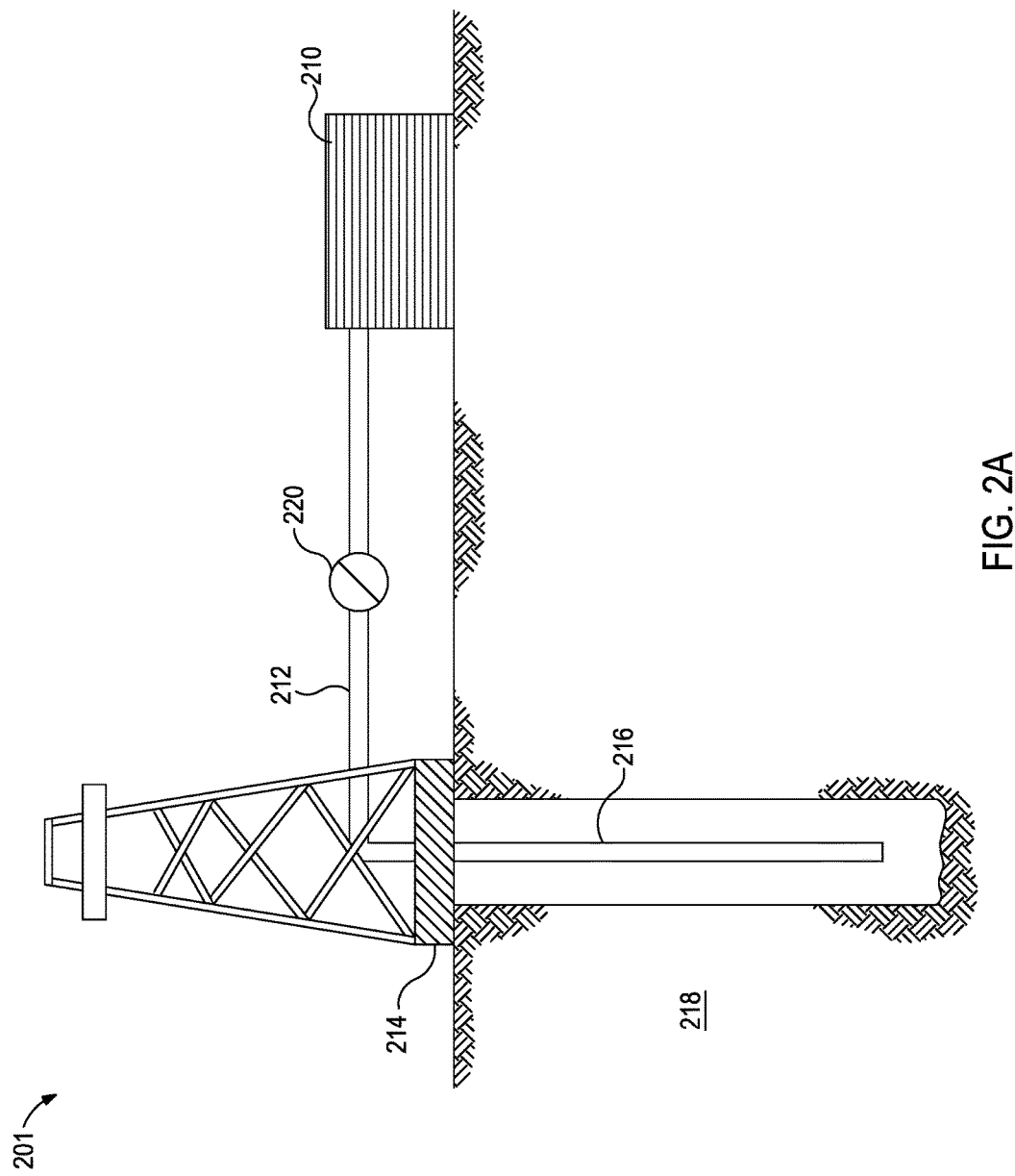
FIG. 2A provides an illustrative representation of a system suitable for varying and delivering the fluids described herein to a downhole location, according to one or more embodiments.

The exemplary embodiments described herein relate to methods of forming proppant packs in subterranean formations and, more specifically, variable strength proppant packs.

The variable strength proppant packs described herein are proppant packs where portions of the proppant pack are intentionally higher strength than other portions. Without being limited by theory, it is believed that intentionally creating higher strength portions in a proppant pack will maintain a higher porosity and conductivity of the proppant pack over time. This may be particularly useful when a proppant pack intentionally includes proppant-free volumes. For example, FIG. 1A provides an illustrative representation of a fracture 100 under formation pressure 102 after the hydraulic pressure has been removed. The proppant pack includes proppant-free portions 104 between first proppant particles 106 and second proppant particles 108, where the second proppant particles 108 have a greater crush strength than the first proppant particles 106. As illustrated, the formation 110 has deformed at the proppant-free portions 104. FIG. 1B provides an illustrative representation of the fracture 100 of FIG. 1A under formation pressure 102 after a period of time has elapsed. Some of the first proppant particles 106 have been crushed and the corresponding portion of the fracture 100 has narrowed. However, the fracture width at the higher strength second proppant particles 108 has been maintained or decreased to a lesser degree. As such, the fracture width at the proppant-free portions 104 has narrowed to a lesser degree than it would have in a corresponding fracture without the second proppant particles 108. Cumulatively, the variable strength proppant pack provides greater porosity and conductivity in the proppant pack over time.

In many fracturing operations, tons of proppant particles are placed in the formation. Because high strength proppant particles like bauxite are typically more expensive than traditional proppant particles like sand, the variable strength proppant packs and associated methods described herein may provide for more effective production operations while managing fracturing operation costs associated with the proppant particles.

Variable strength proppant packs described herein may include (1) first proppant portions comprising first proppant particles, (2) second proppant portions comprising second proppant particles, and (3) optionally proppant-free portions, where the second proppant particles have a crush strength greater than crush strength of the first proppant particles. In some instances, the first proppant portions of the variable strength proppant pack may consist essentially of first proppant particles. In some instances, the second proppant portions of the variable strength proppant pack may consist of essentially of second proppant particles. In some instances, second proppant portions of the variable strength proppant pack may include a mixture of first and second proppant particles.

In some instances, third, fourth, etc. proppant portions may be included in the variable strength proppant packs described herein each having different compositions and/or combinations of proppant particles.

As used herein, the term "crush strength" refers to the highest stress that produces fines of <10% as tested by ISO 13502-2:2006. Crush strength of a material may depend on the particle size, particle shape, and the presence or absence of a coating on the particles.

Exemplary first or second proppant particles may include, but are not limited to, bauxite, ceramic materials, sand, glass materials, nondegradable polymer materials (e.g., deformable or non-deformable under the closure pressure of the formation), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, and composite particulates. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh or less based on the U.S. Sieve Series; however, in certain circumstances, other sizes or mixtures of sizes may be desired and will be entirely suitable for practice of the embodiments of the present invention. In particular embodiments, preferred mean particulate size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

In some preferred embodiments, the first proppant portions of a variable proppant pack described herein may include sand, glass materials, nondegradable polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, or any combination thereof. In some preferred embodiments, the second proppant portions of a variable proppant pack described herein may include bauxite, ceramic materials, or any combination thereof.

In some embodiments, the first proppant particles may have a crush strength of less than about 10,000 psi, and the second proppant particles may have a crush strength of about 10,000 psi or greater. In some embodiments, the first proppant particles may have a crush strength less than about 6,000 psi, and the second proppant particles may have a crush strength of about 6,000 psi or greater.

In some embodiments, the first proppant particles, the second proppant particles, or both, may have a coating. Suitable materials for coating particles may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, silicon-based resins, and binders. Combinations and/or derivatives of these also may be suitable. It is within the ability of one skilled in the art, with the benefit of this disclosure, to determine the type and amount of coating to achieve the desired results.

In some embodiments, the first proppant portions, the second proppant portions, and the optional proppant-free portions may include degradable particles. Degradable particles may be formed of oil-degradable polymers, water-degradable polymers, dehydrated salts, encapsulated salts, or combinations thereof. As used herein, the term "degradable particles" describes polymers that reduce by at least 90% in weight in 10 days under wellbore conditions (e.g., the temperature, pressure, and fluid compositions/flow experience in the formation and/or the wellbore where the particles are to be placed).

As used herein, the term "degradable" and all of its grammatical variants (e.g., "degrade," "degradation," "degrading," and the like) refer to the dissolution or chemical conversion of materials into smaller components, intermediates, or end products by at least one of solubilization, hydrolytic degradation, biologically formed entities (e.g., by bacteria or enzymes), chemical reactions, electrochemical processes, thermal reactions, or reactions induced by radiation. In some instances, the degradation of the material may be sufficient for the mechanical properties of the material to reduce to a point that the material no longer maintains its integrity and, in essence, falls apart. The conditions for degradation are generally wellbore conditions where an external stimuli may be used to initiate or effect the rate of degradation. For example, the pH of the fluid that interacts with the material may be changed by introduction of an acid or a base. The term "wellbore environment" includes both naturally occurring wellbore environments and introduced materials into the wellbore.

Examples of oil-degradable polymers may include, but are not limited to, polyacrylics, polyamides, and polyolefins such as polyethylene, polypropylene, polyisobutylene, and polystyrene. Other suitable oil-degradable polymers include those that have a melting point which is such that the polymer will dissolve at the temperature of the subterranean formation in which it is placed such as a wax material. In some instances, degradable particles may be formed by a combination of the foregoing.

Examples of water-degradable polymers may include, but are not limited to, polysaccharides such as dextran or cellulose, chitins, chitosans, proteins, aliphatic polyesters, poly(lactides), poly(glycolides), poly(ε-caprolactones), poly(hydroxybutyrates), poly(anhydrides), aliphatic or aromatic polycarbonates, poly(orthoesters), poly(amino acids), poly(ethylene oxides), and polyphosphazenes. In some instances, degradable particles may be formed by a combination of the foregoing.

Examples of dehydrated salts may include, but are not limited to, anhydrous sodium tetraborate (also known as anhydrous borax) and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid.

In some embodiments, a variable strength proppant pack described herein may be formed by introducing a sequence of fluid compositions into a subterranean formation that include or exclude proppant particles corresponding to the desired design of the variable strength proppant pack. In some embodiments, proppant particles may be present in the corresponding fluid composition in an amount in the range of from about 0.5 pounds per gallon ("ppg") to about 30 ppg by volume of the fluid. In some embodiments, degradable particles may be present in the corresponding fluid composition in an amount in the range of from about 0.5 ppg to about 30 ppg by volume of the fluid.

In some embodiments, a variable strength proppant pack described herein may be formed by changing the composition of a fluid being introduced into a subterranean formation having a fracture network therein. The composition of the fluid may be changed between at least two compositions that include (1) a first proppant-laden fluid comprising first proppant particles, (2) a second proppant-laden fluid comprising second proppant particles having a crush strength greater than the crush strength of the first proppant particles, and optionally (3) a proppant-free fluid, which corresponds to the first proppant portions, the second proppant portions, and the optional proppant-free portions of the variable strength proppant pack, respectively. In some embodiments, third, fourth, etc. proppant-laden fluids may also be utilized for correspondence to the third, fourth, etc. proppant portions of the variable strength proppant pack.

In some instances, changing the fluid composition may include changing from the first proppant-laden fluid to the proppant-free fluid. In some instances, changing the fluid composition may include changing from the second proppant-laden fluid to the proppant-free fluid.

In some instances, at least a portion of the sequence for changing the fluid composition may be in a set order that is repeated. Examples of sequences that may be performed in a set order may include, but are not limited to, the sequences provide in Table 1.

TABLE 1

| | |
|---|---|
| Sequence 1 | (A) first proppant-laden fluid;<br>(B) second proppant-laden fluid; and<br>(C) repeating the (A) and the (B) fluid compositions at least once more |
| Sequence 2 | (A) second proppant-laden fluid;<br>(B) first proppant-laden fluid; and<br>(C) proppant-free fluid;<br>(D) repeating the (A) through (C) fluid compositions at least once more |
| Sequence 3 | (A) first proppant-laden fluid;<br>(B) second proppant-laden fluid; and<br>(C) proppant-free fluid;<br>(D) repeating the (A) through (C) fluid compositions at least once more |
| Sequence 4 | (A) proppant-free fluid;<br>(B) first proppant-laden fluid;<br>(C) proppant-free fluid;<br>(D) second proppant-laden fluid; and<br>(E) repeating the (A) through (D) fluid compositions at least once more |
| Sequence 5 | (A) proppant-free fluid;<br>(B) first proppant-laden fluid;<br>(C) repeating the (A) and the (B) fluid compositions at least once more;<br>(D) proppant-free fluid;<br>(E) second proppant-laden fluid; and<br>(F) repeating the (A) through (E) fluid compositions at least once more |
| Sequence 6 | (A) proppant-free fluid;<br>(B) first proppant-laden fluid;<br>(C) second proppant-laden fluid;<br>(D) first proppant-laden fluid; and<br>(E) repeating the (A) through (D) fluid compositions at least once more |
| Sequence 7 | (A) proppant-free fluid;<br>(B) second proppant-laden fluid;<br>(C) first proppant-laden fluid;<br>(D) second proppant-laden fluid; and<br>(E) repeating the (A) through (D) fluid compositions at least once more |

The volume of each fluid composition placed in the subterranean formation may be different. In some instances, the volume of the first proppant-laden fluid introduced into the formation may be greater than the volume of the second proppant-laden fluid introduced into the formation. In some instances, the volume of the proppant-free fluid introduced into the formation may be greater than the volume of the first proppant-laden fluid introduced into the formation, which may be greater than the volume of the second proppant-laden fluid introduced into the formation. In some instances, the volume of the first proppant-laden fluid introduced into the formation may be greater than the volume of the proppant-free fluid introduced into the formation, which may be greater than the volume of the second proppant-laden fluid introduced into the formation.

In some instances, the volume of each fluid composition in a repeated sequence may change. For example, the volume of each fluid composition may be varied during the course of the repeated sequence so as to incorporate more proppant at the ends of the fractures and larger proppant-free portions closer to the wellbore.

In some embodiments, additives may be included in the first proppant-laden fluid, the second proppant-laden fluid, and the proppant-free fluid. Exemplary additives may include, but are not limited to, salts, weighting agents, emulsifiers, dispersion aids, corrosion inhibitors, emulsion thinners, emulsion thickeners, viscosifying agents, gelling agents, surfactants, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents, fibers, and the like, and any combination thereof.

In various embodiments, systems configured for varying and delivering the fluids described herein to a downhole location may include a mixing system fluidly coupled to a pump fluidly coupled to a tubular extending into a wellbore penetrating a subterranean formation. As used herein, the terms "fluid communication," "fluidly communicable," "fluidly coupled," and the like refer to two or more components, systems, etc. being coupled such that fluid from one may flow to the other. In some embodiments, other components, systems, etc. may be disposed between the two or more components that are fluidly communicable. For example, valves, flow meters, pumps, mixing tanks, holding tanks, tubulars, separation systems, and the like may be disposed between two or more components that are fluidly communicable.

FIG. 2A provides an illustration of a system suitable for varying and delivering the fluids described herein to a downhole location, according to one or more embodiments. It should be noted that while FIG. 2A generally depicts a land-based system, it is to be recognized that like systems may be operated in subsea locations as well. As depicted in FIG. 2A, system 201 may include mixing system 210, in which a fluid composition described herein may be formulated. The fluid may be conveyed via line 212 to wellhead 214, where the fluid enters tubular 216 that extending from wellhead 214 into subterranean formation 218. Upon being ejected from tubular 216, the fluid may subsequently penetrate into subterranean formation 218 (e.g., via a fracture network, not shown). In some instances, tubular 216 may have a plurality of orifices (not shown) through which the fluid may enter the wellbore proximal to a portion of the subterranean formation 218 to be treated. In some instances, the wellbore may further comprise equipment or tools (not shown) for zonal isolation of a portion of the subterranean formation 218 to be treated.

In various embodiments, a pump 220 (e.g., a low pressure pump, a high pressure pump, or a combination thereof) may convey the fluid from the mixing tank or other source of the treatment fluid to the tubular 216. Pump 220 may be configured to raise the pressure of the fluid to a desired degree before its introduction into tubular 16.

As used herein, the term "high pressure pump" refers to a pump that is capable of delivering a fluid downhole at a pressure of about 1000 psi or greater. A high pressure pump may be used when it is desired to introduce the fluid to a subterranean formation 218 at or above a fracture gradient of the subterranean formation, but it may also be used in cases where fracturing is not desired. In some embodiments, the high pressure pump may be capable of fluidly conveying particulate matter, such as proppant particulates, into the subterranean formation 218. Suitable high pressure pumps will be known to one having ordinary skill in the art and may include, but are not limited to, floating piston pumps and positive displacement pumps.

As used herein, the term "low pressure pump" refers to a pump that operates at a pressure of about 1000 psi or less. In some embodiments, a low pressure pump may be fluidly coupled to a high pressure pump that is fluidly coupled to the tubular 216. That is, in such embodiments, the low pressure pump may be configured to convey the fluid to the high pressure pump. In such embodiments, the low pressure pump may "step up" the pressure of the fluid before it reaches the high pressure pump.

It is to be recognized that system 201 is merely exemplary in nature and various additional components may be present that have not necessarily been depicted in FIG. 2A in the interest of clarity. Nonlimiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2A, the treatment fluid may, in some embodiments, flow back to wellhead 214 and exit subterranean formation 218. In some embodiments, the treatment fluid that has flowed back to wellhead 214 may subsequently be recovered and recirculated to subterranean formation 218.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2A.

Figure 2C:
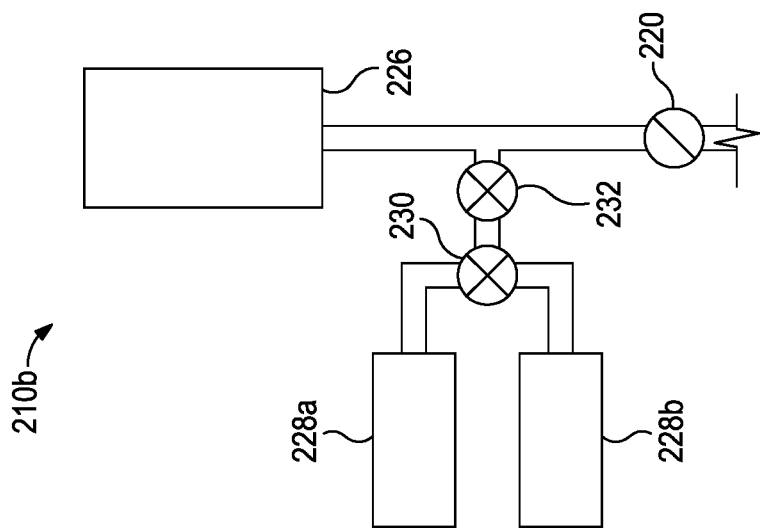
FIG. 2C provides an illustrative representation of a mixing system suitable for continuously flowing a carrier fluid and adding the first and second proppant particles thereto to produce the first proppant-laden fluid and the second proppant-laden fluid, respectively.
Figure 2B:
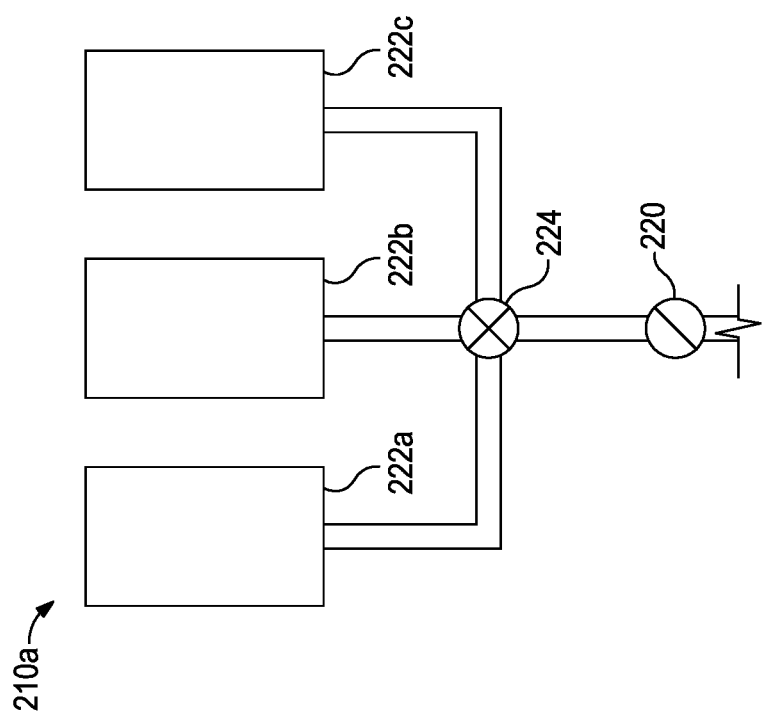
FIG. 2B provides an illustrative representation of a mixing system suitable for alternating between three fluid compositions.

The mixing system 210 may be configured for varying the composition of the fluid being introduced into the formation 218. FIGS. 2B-2D provide exemplary mixing systems 210a, 210b,210c, respectively, that are suitable for use in the system 201.

FIG. 2B provides an illustration of a mixing system 210a suitable for alternating between three fluid compositions. The mixing system 210a includes three containers 222a, 222b,222c for containing the first proppant-laden fluid, the second proppant-laden fluid, and the proppant-free fluid. A valve 224 or other suitable fluid handling component may be used for alternating the fluid composition conveyed to the pump 220 and ultimately the subterranean formation.

FIG. 2C provides an illustration of a mixing system 210b suitable for continuously flowing a carrier fluid and adding the first and second proppant particles thereto to produce the first proppant-laden fluid and the second proppant-laden fluid, respectively. In some instances, the carrier fluid may be proppant-free fluid composition. The mixing system 210b includes a carrier fluid container 226 that may continuously feed into the pump 220. Two containers 228a,228b are included on a side stream where the contents (e.g., first proppant particles and second proppant particles or slurries thereof) may be individually or collectively metered or pulsed into the carrier fluid through valves 230,232.

FIG. 2D provides an illustration of a mixing system 210c suitable for continuously flowing a first proppant-laden fluid and adding second proppant particles thereto to produce the second proppant-laden fluid. The mixing system 210c includes a first proppant-laden fluid container 234 that may continuously feed into the pump 220. Container 236 is included on a side stream where the second proppant particles or a slurry thereof may be metered or pulsed into the first proppant-laden fluid through valve 238. Alternatively, a mixing system similar to the mixing system 210c described may be implemented for continuously flowing a second proppant-laden fluid and adding first proppant particles thereto to produce the first proppant-laden fluid.

One of skill in the art would recognize that the number of containers and the valves in the foregoing exemplary mixing systems may be altered to accommodate more or fewer fluid compositions as needed. Additionally, the containers may be on-site containers or shipping containers (e.g., a truck, a railcar, a barge, or the like). Alternatively, the containers may be substituted with a transport pipeline. Combinations of the foregoing container or alternatives thereof may be included in a single system.

Before introduction of the fluids corresponding to the variable strength proppant pack into the subterranean formation, a fracture network may be formed in the formation by introducing a fracturing fluid into the formation at a pressure sufficient to create or extend at least one fracture in the formation.

Embodiments disclosed herein include:

A. a method that includes continuously introducing a fluid having a composition into a subterranean formation having a fracture network therein, wherein the fluid composition changes between a plurality of compositions that comprise: a first proppant-laden fluid comprising first proppant particles, and a second proppant-laden fluid comprising second proppant particles having a crush strength greater than a crush strength of the first proppant particles; and forming a proppant pack in at least a portion of the fracture network, the proppant pack having first proppant portions comprising the first proppant particles and second proppant portions comprising the second proppant particles;

B. a method that includes introducing a fluid having a composition into a subterranean formation having a fracture network therein, wherein the fluid composition changes between a plurality of compositions that comprise: a first proppant-laden fluid comprising first proppant particles having a crush strength less than about 10,000 psi as determined by ISO 13502-2:2006, a second proppant-laden fluid comprising second proppant particles having a crush strength of about 10,000 psi or greater as determined by ISO 13502-2:2006, and a proppant-free fluid; and forming a proppant pack in at least a portion of the fracture network, the proppant pack having first proppant portions comprising the first proppant particles, second proppant portions comprising the second proppant particles, and proppant-free portions; and C. a system that includes a mixing system fluidly coupled to a pump via a first tubular, wherein the mixing system includes a first container containing first proppant particles or a slurry thereof, a second container containing second proppant particles or a slurry thereof, and a valve configured to alternate between (1) fluid communication from the first container to the first tubular and (2) fluid communication from the second container to the first tubular, wherein the second proppant particles have a crush strength greater than a crush strength of the first proppant particles; and a second tubular fluidly coupled to the pump and extending into a wellbore penetrating a subterranean formation.

Each of Embodiments A and B may have one or more of the following additional elements in any combination: Element 1: wherein the plurality of compositions further comprises a proppant-free fluid, and wherein the proppant pack further includes proppant-free portions; Element 2: Element 1 wherein during at least a portion of introducing the fluid into the subterranean formation the composition of the fluid changes from the first proppant-laden fluid to the proppant-free fluid; Element 3: Element 1 wherein during at least a portion of introducing the fluid into the subterranean formation the composition of the fluid changes from the second proppant-laden fluid to the proppant-free fluid; Element 4: Element 1 wherein changing the composition of the fluid is according to: (A) the proppant-free fluid; (B) the first proppant-laden fluid; (C) the proppant-free fluid; (D) the second proppant-laden fluid; and (E) the (A) through (D) compositions at least once more; Element 5: Element 1 wherein changing the composition of the fluid is according to: (A) the proppant-free fluid; (B) the first proppant-laden fluid; (C) repeating the (A) and the (B) compositions at least once more; (D) the proppant-free fluid; (E) the second proppant-laden fluid; and (F) the (A) through (E) compositions at least once more; Element 6: Element 1 wherein changing the composition of the fluid is according to at least one of Sequences 1-7 described herein; Element 7: Element 1 wherein a volume of the proppant-free fluid introduced into the subterranean formation is greater than a volume of the first proppant-laden fluid introduced into the subterranean formation; Element 8: Element 1 wherein a volume of the first proppant-laden fluid introduced into the subterranean formation is greater than a volume of the second proppant-laden fluid introduced into the subterranean formation; Element 9: Element 1 wherein the proppant-free fluid comprises degradable particles; Element 10: wherein a volume of the first proppant-laden fluid introduced into the subterranean formation is greater than a volume of the second proppant-laden fluid introduced into the subterranean formation; Element 11: wherein changing the composition of the fluid involves continuously flowing a carrier fluid and adding the first proppant particles into the carrier fluid and separately adding the second proppant particles into the carrier fluid to produce the first and second proppant-laden fluids, respectively; Element 12: Element 11 wherein the carrier fluid is a proppant-free fluid, wherein the plurality of compositions further comprises a proppant-free fluid, and wherein and the proppant pack further includes proppant-free portions; Element 13: wherein the first proppant portions of the proppant pack consist essentially of the first proppant particles and the second proppant portions of the proppant pack consist essentially of the second proppant particles; Element 14: wherein the second proppant-laden fluid further comprises the first proppant particles and the second proppant portions of the proppant pack further comprise the first proppant particles; and Element 15: Element 14 wherein changing the composition of the fluid involves continuously flowing the first proppant-laden fluid and metering the second proppant particles into the first proppant-laden fluid to produce the second proppant-laden fluid.

Each of Embodiments A, B, and C may have one or more of the following additional elements in any combination: Element 16: wherein at least one of the first proppant particles or the second proppant particles have a coating; Element 17: wherein at least one of the first proppant-laden fluid or the second proppant-laden fluid further comprises degradable particles; Element 18: wherein the first proppant particles has have a crush strength less than about 10,000 psi as determined by ISO 13502-2:2006; Element 19: wherein the first proppant particles have a crush strength less than about 6,000 psi as determined by ISO 13502-2:2006; Element 20: wherein the second proppant particles have a crush strength of about 10,000 psi or greater as determined by ISO 13502-2:2006; Element 21: wherein the second proppant particles have a crush strength of about 6,000 psi or greater as determined by ISO 13502-2:2006 (except for Embodiment B); Element 22: wherein the first proppant particles are selected from the group consisting of: sand, glass materials, nondegradable polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, and composite particulates; and Element 23: wherein the second proppant particles are selected from the group consisting of: bauxite and ceramic materials.

By way of non-limiting example, exemplary combinations applicable to Embodiments A, B, and C include: Element 16 in combination with at least one of Elements 18-23 and optionally Element 17; Element 16 in combination with Element 17; Element 17 in combination with at least one of Elements 18-23; and so on.

By way of non-limiting example, exemplary combinations applicable to Embodiments A and B include: Element 9 in combination with at least one of Elements 1-8; Element 12 in combination with at least one of Elements 1-9; at least one of Elements 2-6 in combination with at least one of Elements 7-8; Element 13 in combination with at least one of Elements 1-9; Element 13 in combination with at least one of Elements 14-15 and optionally Element 10; Element 10 in combination with Element 13; at least one of Elements 16-23 in combination (including in any of the foregoing combinations) with at least one of Elements 1-15 (including in any of the foregoing combinations); and so on.

Unless otherwise indicated, all numbers expressing quantities of ingredients, properties such as molecular weight, reaction conditions, and so forth, used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   continuously introducing a fluid composition into a subterranean formation having a fracture network therein, wherein during the introducing the fluid composition changes between (i), (ii) and (iii), as follows:
   (i) a first proppant-laden fluid comprising first proppant particles that have a coating,
   (ii) a second proppant-laden fluid comprising second proppant particles having a crush strength greater than a crush strength of the first proppant particles, and
   (iii) a proppant-free fluid comprising degradable particles; and
   forming a proppant pack in at least a portion of the fracture network, the proppant pack having a first proppant portion comprising the first proppant particles, a second proppant portion comprising the second proppant particles, and a proppant-free portion disposed between the first proppant portion and the second proppant portion, wherein the fluid composition changes includes multiple instances of: changing to the proppant-free fluid from the first proppant-laden fluid and also changing to the proppant-free fluid from the second proppant-laden fluid.

2. The method of claim 1, wherein during at least a portion of the introducing the fluid into the subterranean formation the composition of the fluid changes from the first proppant-laden fluid to the proppant-free fluid before the composition of the fluid changes to the second proppant-laden fluid.

3. The method of claim 1, wherein during at least a portion of the introducing the fluid into the subterranean formation the composition of the fluid changes from the second proppant-laden fluid to the proppant-free fluid before the composition of the fluid changes to the first proppant-laden fluid.

4. The method of claim 1, wherein the step of changing the fluid composition comprises, in order, (A) to (E), as follows:
   (A) the proppant-free fluid;
   (B) the first proppant-laden fluid;
   (C) the proppant-free fluid;
   (D) the second proppant-laden fluid; and
   (E) the (A) through (D) compositions at least once more.

5. The method of claim 1, wherein the step of changing the fluid composition comprises, in order, (A) to (F), as follows:
   (A) the proppant-free fluid;
   (B) the first proppant-laden fluid;
   (C) repeating the (A) and the (B) compositions at least once more;
   (D) the proppant-free fluid;
   (E) the second proppant-laden fluid; and
   (F) the (A) through (E) compositions at least once more.

6. The method of claim 1, wherein a volume of the proppant-free fluid introduced into the subterranean formation is greater than a volume of the first proppant-laden fluid introduced into the subterranean formation.

7. The method of claim 1, wherein a volume of the first proppant-laden fluid introduced into the subterranean formation is greater than a volume of the second proppant-lade fluid introduced into the subterranean formation.

8. The method of claim 1, wherein the degradable particles comprise at least one of: oil-degradable polymers, water degradable polymers, dehydrated salts, or encapsulated salts.

9. The method of claim 1, wherein the step of changing the fluid composition involves continuously flowing a carrier fluid and adding the first proppant particles into the carrier fluid and separately adding the second proppant particles into the carrier fluid to produce the first and second proppant-laden fluids, respectively.

10. The method of claim 1, wherein the first proppant portions of the proppant pack consist essentially of the first proppant particles and the second proppant portions of the proppant pack consist essentially of the second proppant particles.

11. The method of claim 1, wherein the second proppant-laden fluid further comprises the first proppant particles and the second proppant portions of the proppant pack further comprise the first proppant particles.

12. The method of claim 11, wherein the step of changing the fluid composition involves continuously flowing the first proppant-laden fluid and metering the second proppant particles into the first proppant-laden fluid to produce the second proppant-laden fluid.

13. The method of claim 1, wherein the second proppant particles have a coating.

14. The method of claim 1, wherein at least one of the first proppant-laden fluid or the second proppant-laden fluid further comprises the degradable particles.

15. The method of claim 1, wherein the first proppant particles have a crush strength of less than about 10,000 psi as determined by ISO 13502-2:2006.

16. The method of claim 1, wherein the second proppant particles have a crush strength of about 10,000 psi or greater as determined by ISO 13502-2:2006.

17. The method of claim 1, wherein the first proppant particles are selected from the group consisting of: sand, glass materials, nondegradable polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, and composite particulates.

18. The method of claim 1, wherein the second proppant particles are selected from the group consisting of bauxite and ceramic materials.

19. The method of claim 1, wherein the coating comprises: a non-aqueous tackifying agent, an aqueous tackifying agent, an emulsified tackifying agent, a silyl-modified polyamide compound, a resin, a crosslinkable aqueous polymer composition, a polymerizable organic monomer composition, a consolidating agent emulsion, a zeta-potential modifying aggregating composition, a silicon-based resin, a binder, or any combination thereof.

20. The method of claim 1, wherein the degradable particles comprising the proppant-free fluid comprise oil degradable particles.

21. A method comprising:
continuously introducing a fluid composition into a subterranean formation having a fracture network therein, wherein during the introducing the fluid composition changes between (i), (ii) and (iii), as follows:
  (i) a first proppant-laden fluid comprising first proppant particles having a coating and having a crush strength of less than about 10,000 psi as determined by ISO 13502-2:2006,
  (ii) a second proppant-laden fluid comprising second proppant particles having a crush strength of about 10,000 psi or greater as determined by ISO 13502-2:2006, and
  (iii) a proppant-free fluid comprising oil degradable particles; and
forming a proppant pack in at least a portion of the fracture network, the proppant pack having first proppant portions comprising the first proppant particles, second proppant portions comprising the second proppant particles, and a proppant-free portion disposed between at least one of the first proppant portions and at least one of the second proppant portions, wherein the fluid composition changes includes multiple instances of: changing to the proppant-free fluid from the first proppant-laden fluid and also changing to the proppant-free fluid from the second proppant-laden fluid.

22. The method of claim 21, wherein the fluid composition changes includes at least one sequence of, in order: changing from the proppant-free fluid to the second proppant-laden fluid to the first proppant-laden fluid to the second proppant-laden fluid.

* * * * *